US012531346B2

(12) United States Patent
Wu et al.

(10) Patent No.: US 12,531,346 B2
(45) Date of Patent: Jan. 20, 2026

(54) ANTENNA AND MANUFACTURING METHOD THEREOF

(71) Applicant: BOE TECHNOLOGY GROUP CO., LTD., Beijing (CN)

(72) Inventors: Qianhong Wu, Beijing (CN); Shuo Zhang, Beijing (CN); Dongdong Zhang, Beijing (CN); Feng Qu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 369 days.

(21) Appl. No.: 17/800,152

(22) PCT Filed: Oct. 28, 2021

(86) PCT No.: PCT/CN2021/127072

§ 371 (c)(1),
(2) Date: Aug. 16, 2022

(87) PCT Pub. No.: WO2022/160823

PCT Pub. Date: Aug. 4, 2022

(65) Prior Publication Data

US 2023/0071974 A1 Mar. 9, 2023

(30) Foreign Application Priority Data

Jan. 28, 2021 (CN) ......................... 202110119558.1

(51) Int. Cl.
*H01Q 9/04* (2006.01)
*H01Q 1/24* (2006.01)
*H01Q 5/25* (2015.01)

(52) U.S. Cl.
CPC ............ *H01Q 9/045* (2013.01); *H01Q 1/241* (2013.01); *H01Q 5/25* (2015.01)

(58) Field of Classification Search
CPC .... H01Q 9/045; H01Q 1/523; H01Q 21/0075; H01Q 21/065; H01Q 9/0407
See application file for complete search history.

(56) References Cited

U.S. PATENT DOCUMENTS

2002/0122010 A1* 9/2002 McCorkle ................ H01Q 9/40 343/846
2005/0248487 A1 11/2005 Okado
(Continued)

FOREIGN PATENT DOCUMENTS

CN 101060200 A 10/2007
CN 101304119 A 11/2008
(Continued)

OTHER PUBLICATIONS

J. Dong, S. Wang and J. Mo, "Design of a Twelve-Port MIMO Antenna System for Multi-Mode 4G/5G Smartphone Applications Based on Characteristic Mode Analysis," in IEEE Access, vol. 8, pp. 90751-90759, 2020, doi: 10.1109/ACCESS.2020.2994068. (Year: 2020).*
(Continued)

*Primary Examiner* — Hai V Tran
*Assistant Examiner* — Austin M Back
(74) *Attorney, Agent, or Firm* — HOUTTEMAN LAW LLC

(57) ABSTRACT

An antenna includes: a dielectric layer having a first surface and a second surface opposite to each other in a thickness direction thereof; a reference electrode layer on the first surface of the dielectric layer, wherein at least one side edge thereof is each provided with at least one first slot which is arc-shaped; at least one radiation element on the second surface of the dielectric layer, wherein an orthographic projection of each radiation element on the dielectric layer is within an orthographic projection of one first slot on the dielectric layer; and at least one first microstrip line on the
(Continued)

second surface of the dielectric layer, wherein each first microstrip line is electrically connected to the radiation patch, and an orthographic projection of the first microstrip line on the dielectric layer at least partially overlaps an orthographic projection of the reference electrode layer on the dielectric layer.

19 Claims, 6 Drawing Sheets

(56) References Cited

U.S. PATENT DOCUMENTS

| | | | | |
|---|---|---|---|---|
| 2019/0305415 | A1 | 10/2019 | Sharawi et al. | |
| 2020/0067191 | A1* | 2/2020 | Rogers | H01Q 9/045 |
| 2020/0395680 | A1* | 12/2020 | Kim | H01Q 21/065 |

FOREIGN PATENT DOCUMENTS

| | | | | | |
|---|---|---|---|---|---|
| CN | 101431183 | A | | 5/2009 | |
| CN | 101622755 | A | | 1/2010 | |
| CN | 101924272 | A | | 12/2010 | |
| CN | 101060200 | B | * | 6/2011 | |
| CN | 102437406 | A | | 5/2012 | |
| CN | 203398287 | U | | 1/2014 | |
| CN | 103794874 | A | | 5/2014 | |
| CN | 104505590 | A | * | 4/2015 | |
| CN | 104681922 | A | | 6/2015 | |
| CN | 104681931 | A | | 6/2015 | |
| CN | 106981719 | A | * | 7/2017 | H01Q 1/243 |
| CN | 107645067 | A | | 1/2018 | |
| CN | 107871930 | A | | 4/2018 | |
| CN | 108429005 | A | | 8/2018 | |
| CN | 108963432 | A | | 12/2018 | |
| CN | 209963237 | U | | 1/2020 | |
| CN | 110867653 | A | | 3/2020 | |
| CN | 111313140 | A | | 6/2020 | |
| CN | 210668679 | U | | 6/2020 | |
| CN | 106104913 | B | | 7/2020 | |
| CN | 112134029 | A | | 12/2020 | |
| CN | 215579068 | U | | 1/2022 | |

OTHER PUBLICATIONS

China Patent Office, CN202110119558.1 First Office Action issued on Aug. 15, 2023.

Khan et al., "A compact 8-element MIMO antenna system for 802.11 ac WLAN applications," Conference Paper, 2013 International Workshop on Antenna Tech., May 23, 2013, pp. 95-98.

Supreeyatitikul, et al., "Wideband 4-Port MIMO Antenna Array for 5G Millimeter-Wave Mobile Device Terminals," Conference Paper, International Union of Radio Science General Assembly and Scientific Symposium, Oct. 20, 2020.

Li, Chuan, "Multi-Antenna System For 5G Multi-Mode Terminal," Master Dissertation, Feb. 15, 2017, Chapter 3, Univ. Electronic Sci. & Tech. of China, Chengdu, China. English Abstract.

Ismail et al., "Dual-fed Circular Polarization Compact Array Antenna," Conference Paper, 2012 IEEE Asia-Pacific Conference on Applied Electromagnetics, Dec. 11-13, 2012, pp. 116-119, Melaka, Malaysia.

Ling, Xue Chun, "The Research and Optimization design of the Ultra-wideband Antennas with High Gain," Masters Dissertation, May 2016, Chapter 4.2.2, Nanjing Univ. of Sci. & Tech., Nanjing, China. English Abstract.

* cited by examiner

ANTENNA AND MANUFACTURING METHOD THEREOF

TECHNICAL FIELD

The present disclosure belongs to the technical field of antenna, and particularly relates to an antenna and a manufacturing method thereof.

BACKGROUND

Compared with 4G (the 4th generation mobile communication technology), 5G (the 5th generation mobile communication technology) has the advantages of higher data rate, larger network capacity, lower time delay and the like. A 5G frequency plan includes two parts, namely, a low frequency band and a high frequency band, wherein the low frequency band (3 GHz to 6 GHz) has good propagation characteristics and very abundant spectrum resources, so that development of an antenna unit and an array applied for the low frequency band communication gradually becomes a research and development hotspot at present.

Based on practical application scenarios of 5G mobile communication, a 5G low frequency band antenna should have technical features such as high gain, miniaturization, and wide frequency band. A microstrip antenna is a commonly used antenna which has a simple structure, is easy to form an array and can realize high gain, but an application of the microstrip antenna in 5G low frequency mobile communication is restricted due to its narrow bandwidth and its large antenna size at a low frequency band.

SUMMARY

The present disclosure aims to solve at least one technical problem in the prior art and provides an antenna and a manufacturing method thereof.

In a first aspect, an embodiment according to the present disclosure provides an antenna, which includes:

- a dielectric layer having a first surface and a second surface opposite to each other in a thickness direction of the dielectric layer;
- a reference electrode layer on the first surface of the dielectric layer, wherein at least one side edge of the reference electrode layer each is provided with at least one first slot, and the at least one first slot each is an arc-shaped slot;
- at least one radiation element on the second surface of the dielectric layer, wherein an orthographic projection of each of the at least one radiation element on the dielectric layer is within an orthographic projection of one of the at least one first slot on the dielectric layer; and
- at least one first microstrip line on the second surface of the dielectric layer, wherein each of the at least one first microstrip line is electrically connected to the radiation patch, and an orthographic projection of the first microstrip line on the dielectric layer at least partially overlaps an orthographic projection of the reference electrode layer on the dielectric layer.

The at least one radiation element is in a one-to-one correspondence with the at least one first slot, and a certain distance exists between orthographic projections of centers of the radiation element and the first slot, which are correspondingly arranged to each other, on the dielectric layer.

The microstrip antenna further includes a feeding structure, wherein the feeding structure is electrically connected to the at least one first microstrip line.

The reference electrode layer has a first side edge and a second side edge in a length direction of the reference electrode layer, and the first side edge and the second side edge are opposite to each other; at least one of the first side edge and the second side edge is provided with the at least one first slot; the feeding structure includes at least one feeding unit, and each of the at least one feeding unit is electrically connected to the first microstrip lines connected to the radiation elements on a same side as the feeding unit.

Both the first side edge and the second side edge of the reference electrode layer are provided with the at least one first slot, the at least one first slot on each of the first side edge and the second side edge includes $2^n$ number of the first slots, and each of the at least one feeding unit includes n stages of second microstrip lines;

- one second microstrip line at a $1^{st}$ stage is connected to two adjacent first transmission lines, and the first transmission lines connected to different second microstrip lines at the $1^{st}$ stage are different; one second microstrip line at an $m^{th}$ stage is connected to two adjacent second microstrip lines at an $(m-1)^{th}$ stage, and the second feeding lines at the $(m-1)^{th}$ stage connected to different second feeding lines at the $m^{th}$ stage are different; wherein n is greater than or equal to 2, m is greater than or equal to 2 and less than or equal to n, and both m and n are integers.

The reference electrode layer includes a first reference electrode sub-layer and a second reference electrode sub-layer which are arranged side by side, a side edge of the first reference electrode sub-layer opposite to the second reference electrode sub-layer is the first side edge, and a side edge of the second reference electrode sub-layer opposite to the first reference electrode sub-layer is the second side edge.

The feeding structure further includes a converter; wherein the converter includes a first feeding port, a second feeding port, and a third feeding port; and the second feeding port and the third feeding port are connected to two second microstrip lines at the $n^{th}$ stage of different feeding units, respectively.

The antenna is in mirror symmetry with respect to an extending direction of a perpendicular bisector of a width of the reference electrode layer.

The feeding structure is in mirror symmetry with respect to an extending direction of a perpendicular bisector of a width of the reference electrode layer.

Only one of the first side edge and the second side edge of the reference electrode layer is provided with the at least one first slot, the at least one first slot includes $2^n$ number of the first slots, and each of the at least one feeding unit includes n stages of second microstrip lines;

- one second microstrip line at a $1^{st}$ stage is connected to two adjacent first transmission lines, and the first transmission lines connected to different second microstrip lines at the $1^{st}$ stage are different; one second microstrip line at an $m^{th}$ stage is connected to two adjacent second microstrip lines at an $(m-1)^{th}$ stage, and the second feeding lines at the $(m-1)^{th}$ stage connected to different second feeding lines at the $m^{th}$ stage are different; wherein n is greater than or equal to 2, m is greater than or equal to 2 and less than or equal to n, and both m and n are integers.

The feeding structure further includes a converter; wherein the converter includes a first feeding port and a second feeding port, and the second feeding port is connected to the second microstrip line at the nth stage of the feeding unit.

The dielectric layer includes a first dielectric sub-layer and a second dielectric sub-layer stacked together; the reference electrode layer is on a side of the first dielectric sub-layer away from the second dielectric sub-layer, the at least one radiation element and the at least one first microstrip line are on a side of the second dielectric sub-layer away from the first dielectric sub-layer, and the first dielectric sub-layer is connected to the second dielectric sub-layer through an adhesive layer.

The first dielectric sub-layer and the second dielectric sub-layer each are made of glass.

A distance between every two adjacent first slots on a same side edge of the reference electrode layer is constant.

On a same side edge of the reference electrode layer, a second slot is disposed between two adjacent first slots.

The second slot includes a rectangular slot.

An orthographic projection of each of the at least one radiation element on the first dielectric layer is within an orthographic projection of the first slot corresponding to the radiation element, on the first dielectric layer.

Each of the at least one first microstrip line includes a first portion and a second portion electrically connected to each other, the first portion is connected to the corresponding radiation element, the second portion is electrically connected to a feeding structure, and an extending direction of the first portion and an extending direction of the second portion are perpendicular to each other.

An impedance of each of the at least one first microstrip line is 50Ω.

On a side of the at least one first microstrip line and the at least one radiation element, away from the second surface of the dielectric layer, is further provided a cover plate.

In a second aspect, an embodiment of the present disclosure provides a method for manufacturing an antenna, including:

providing a dielectric layer;

forming a pattern including a reference electrode layer on a first surface of the dielectric layer through a patterning process; wherein at least one side edge of the reference electrode layer each is provided with at least one first slot which is an arc-shaped slot; and forming a pattern including at least one radiation element and at least one first microstrip line on the second surface of the dielectric layer through a patterning process; wherein an orthographic projection of each of the at least one radiation element on the dielectric layer at least partially overlaps an orthographic projection of one of the at least one first slot on the dielectric layer; each of the at least one first microstrip line is electrically connected to the radiation patch, and an orthographic projection of the first microstrip line on the dielectric layer at least partially overlaps an orthographic projection of the reference electrode layer on the dielectric layer.

The dielectric layer includes a first dielectric sub-layer and a second dielectric sub-layer stacked together; and the method includes:

forming the reference electrode layer on a side of the first dielectric sub-layer away from the second dielectric sub-layer;

forming the at least one radiation element and the at least one first microstrip line on a side of the second dielectric sub-layer away from the first dielectric sub-layer; and bonding the first dielectric sub-layer and the second dielectric sub-layer together, through an adhesive layer.

The first dielectric sub-layer and the second dielectric sub-layer each are made of glass.

The method further includes: forming a feeding structure while forming the pattern including the at least one radiation element and the at least one first microstrip line on the second surface of the dielectric layer through a patterning process.

Figure 5:
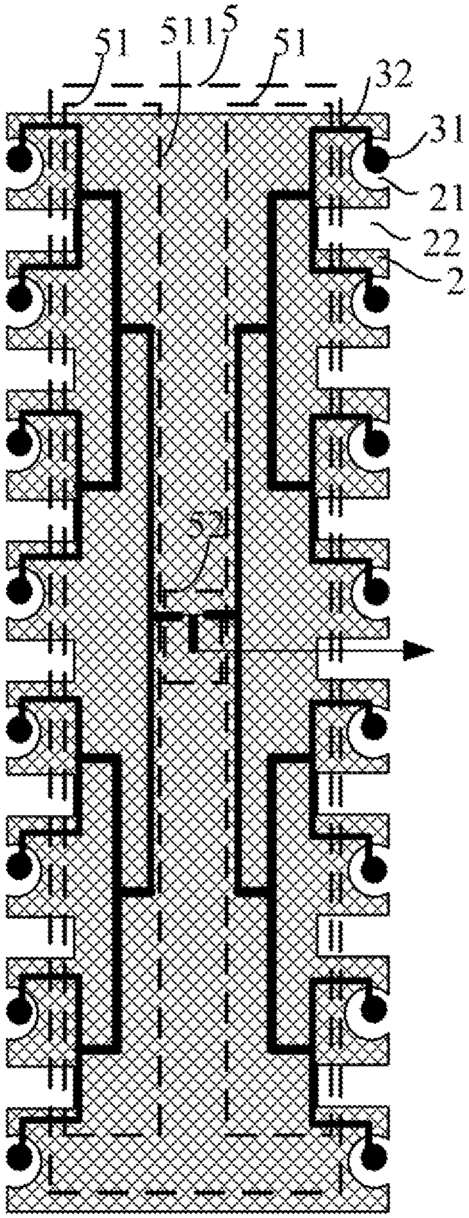
Figure 6:
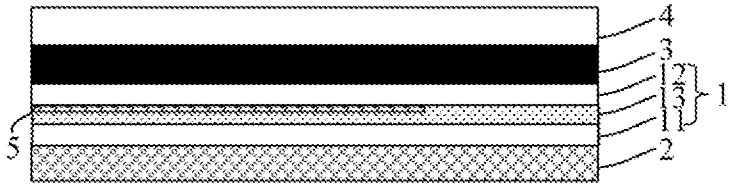
Figure 7:
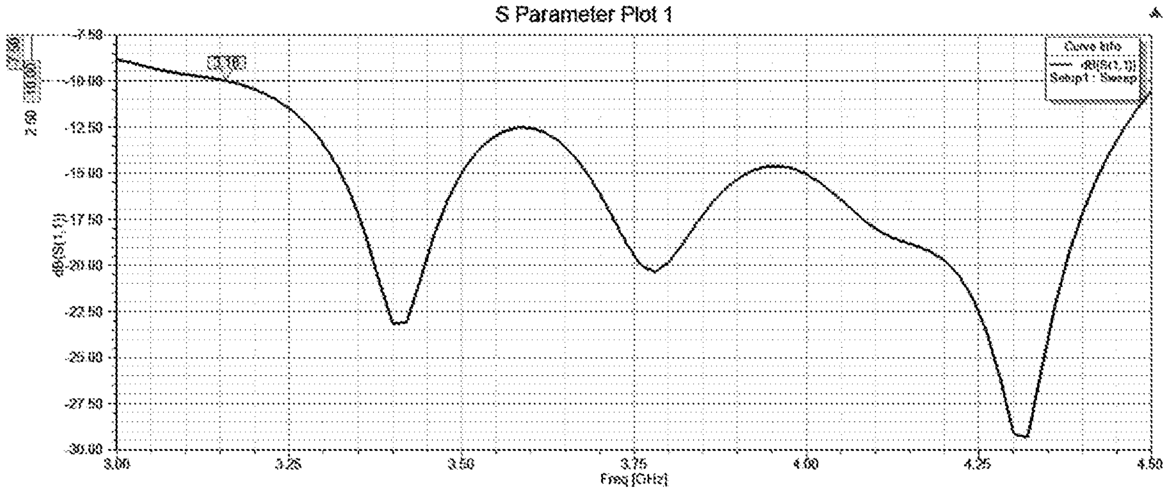
Figure 8:
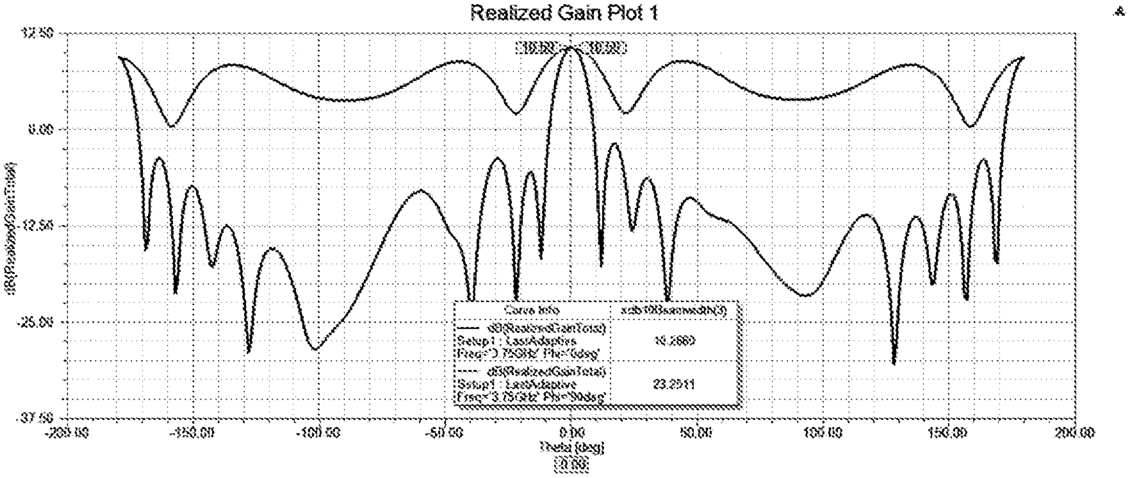
Figure 9:
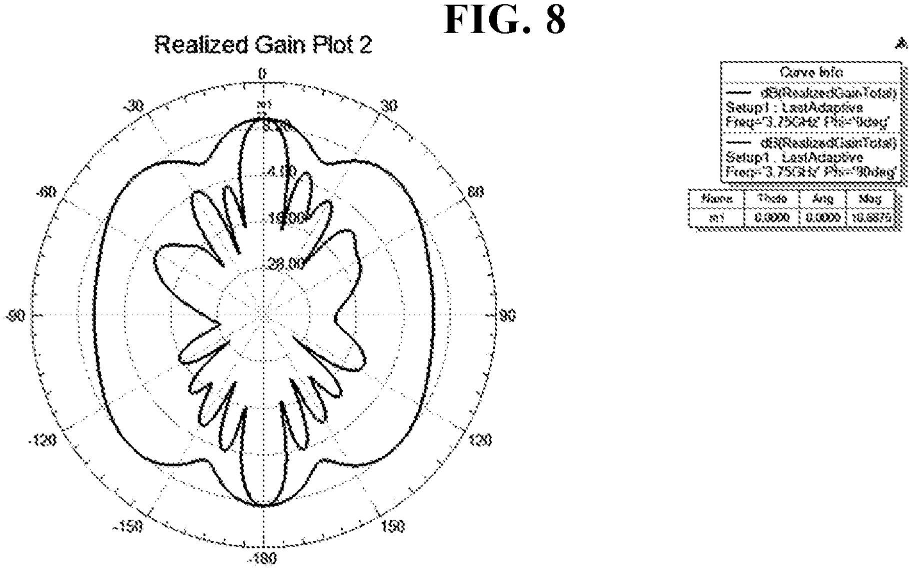
Figure 10:
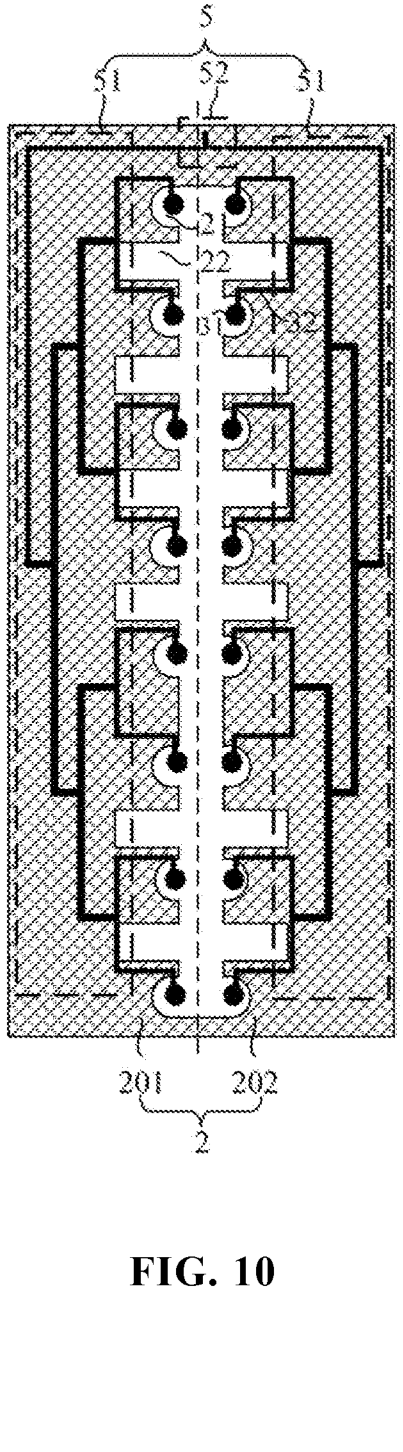
Figure 11:
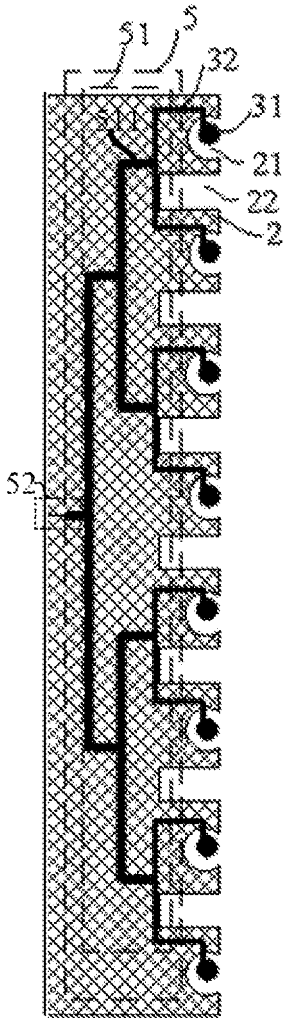

FIG. **4*a*** is a cross-sectional view of another antenna in an embodiment of the present disclosure;

FIG. **4*b*** is a cross-sectional view of another antenna in an embodiment of the present disclosure;

FIG. 5 is a top view of another antenna in an embodiment of the present disclosure;

FIG. 6 is a cross-sectional view of another antenna in an embodiment of the present disclosure;

FIG. 7 illustrate a $S_{11}$ parameter plot for ports of a 2×8 antenna array shown in FIG. 5;

FIG. 8 is a plane pattern of the 2×8 antenna array shown in FIG. 5 at a frequency f=3.75 GHz;

FIG. 9 is a polar representation of the plane pattern of the 2×8 antenna array shown in FIG. 5 at a frequency f=3.75 GHz;

FIG. 10 is a top view of another antenna in an embodiment of the present disclosure; and FIG. 11 is a top view of another antenna in an embodiment of the present disclosure.

DETAIL DESCRIPTION OF EMBODIMENTS

In order to enable one of ordinary skill in the art to better understand the technical solutions of the present disclosure, the present disclosure will be further described in detail below with reference to the accompanying drawings and specific embodiments.

Unless defined otherwise, technical or scientific terms used herein shall have the ordinary meaning as understood by one of ordinary skill in the art to which this disclosure belongs. The use of "first," "second," and the like in the present disclosure is not intended to indicate any order, quantity, or importance, but rather serves to distinguish one element from another. Also, the term "a," "an," or "the" or the like does not denote a limitation of quantity, but rather denotes the presence of at least one. The word "comprising", "comprises", or the like, means that the element or item preceding the word includes the element or item listed after the word and its equivalent, but does not exclude other elements or items. The term "connected", "coupled" or the like is not restricted to physical or mechanical connections, but may include electrical connections, whether direct or indirect. The terms "upper", "lower", "left", "right", and the like are used only to indicate relative positional relationships, and when the absolute position of the object being described is changed, the relative positional relationships may also be changed accordingly.

It should be noted that $S_{11}$ mentioned in the following description refers to one of S parameters, and represents return loss characteristics, and the dB value and impedance characteristics of the loss are generally observed through a network analyzer. The parameter $S_{11}$ indicates whether the radiation efficiency of the antenna is good or not. The larger the value is, the more energy is reflected back by the antenna itself, so the worse the efficiency of the antenna is.

Figure 1:
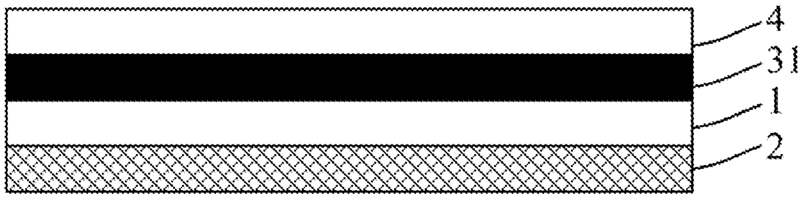
FIG. 1 is a cross-sectional view of an antenna in an embodiment of the present disclosure.
Figure 2:
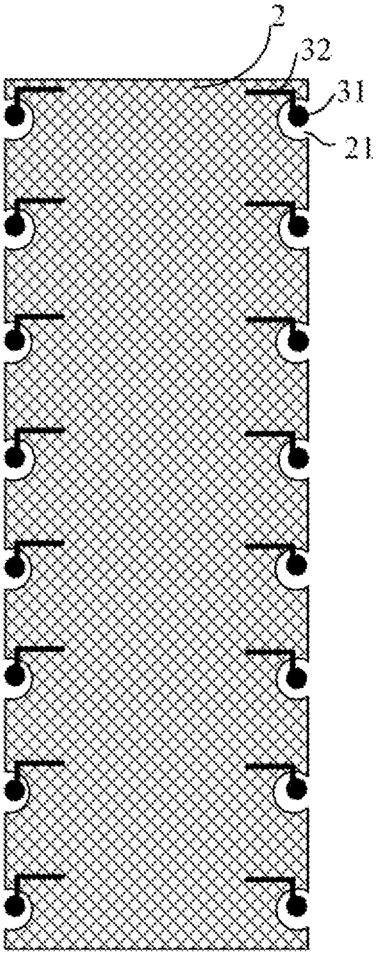
FIG. 2 is a top view of an antenna in an embodiment of the present disclosure.

FIG. 1 is a cross-sectional view of an antenna in an embodiment of the present disclosure; FIG. 2 is a top view of an antenna in an embodiment of the present disclosure. In a first aspect, as shown in FIGS. 1 and 2, the present disclosure provides an antenna, which includes a dielectric layer 1, a reference electrode layer, radiation elements 31, and first microstrip lines 32. The dielectric layer 1 includes a first surface and a second surface opposite to each other in a thickness direction of the dielectric layer, for example, the first surface is a lower surface shown in FIG. 1 and the second surface is an upper surface shown in FIG. 1. The reference electrode layer is disposed on the first surface, and at least one side edge of the reference electrode layer is provided with first slots 21, and each first slot 21 is an arc-shaped slot. The radiation elements 31 are disposed on the second surface of the dielectric layer 1, and an orthographic projection of each radiation element 31 on the dielectric layer 1 is within an orthographic projection of one first slot 21 on the dielectric layer 1, for example, the radiation elements 31 are disposed in a one-to-one correspondence with the first slots 21. The first microstrip lines 32 are disposed on the second surface of the dielectric layer 1. Each first microstrip line 32 is electrically connected to one radiation element 31, and an orthographic projection of the first microstrip line at least partially overlaps an orthographic projection of the reference electrode layer on the dielectric layer 1. The first microstrip line 32 is configured to feed the radiation element 31.

It should be noted that, in the embodiment of the present disclosure, the radiation element 31 and the first slot 21 are disposed in a one-to-one correspondence as an example for description. The first slot 21 is an arc-shaped slot, and accordingly, in order to adapt to the first slot 21, a circular metal patch structure is preferably used for the radiation element 31. As shown in FIG. 2, in the embodiment of the present disclosure, a shape of the radiation element 31 is a circle as an example, but it should be understood that, in a practical product, the radiation element 31 may adopt a plate element of a shape such as an ellipse, a semicircle, a polygon, or the like.

The above mentioned is as shown in FIG. 2. In addition, the reference electrode layer includes, but is not limited to, a ground electrode layer 2. In the embodiments of the present disclosure, the reference electrode layer is the ground electrode layer 2 as an example for description.

Figure 3:
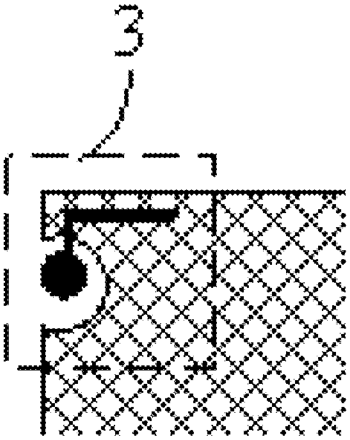
FIG. 3 is a schematic diagram of an antenna unit in an embodiment of the present disclosure.

In the antenna of the embodiment of the present disclosure, an arc-shaped slot is disposed in the ground electrode layer 2, and the radiation element 31 is a circular metal patch. FIG. 3 is a schematic diagram of an antenna unit in an embodiment of the present disclosure. As shown in FIG. 3, one first slot 21 in the ground electrode layer 2 and one radiation element 31 connected to the first microstrip line 32 constitute one antenna unit. In a high frequency band of an ultra-wideband, the radiation element 31 serves as a main radiation source, and a prototype of the structure of the radiation element 31 is equivalent to a monopole antenna. In a low frequency band, the radiation element 31 and the arc-shaped first slot 21 increase the antenna's capacitance. It is verified through simulation that the frequency band of the antenna unit can be widened, and the working bandwidth is 1.22 GHz (3.28 GHz to 4.5 GHz, $S_{11}$<−10 dB)/1.34 GHz (3.16 GHz to 4.5 GHz, $S_{11}$<−10 dB). At the same time, by combining with a miniaturized design, the antenna unit is made to have a size of only about 25 mm×25 mm×1.5 mm. In order to meet the requirements of high gain and wide bandwidth, the antenna units are arrayed to obtain the antenna in the embodiments of the present disclosure. For example, the antenna units as shown in FIG. 3 are arrayed, and an arrangement with a mirror symmetry is adopted, so that a 2×8 array antenna is obtained. A gain of the array antenna may reach 10.59 dBi at 3.75 GHz, an impedance bandwidth of the array antenna is 1.34 GHz (3.16 GHz to 4.5 GHz, $S_{11}$<−10 dB)/1.5 GHz (3 GHz to 4.5 GHz, $S_{11}$<−6 dB), and a size of the array antenna is only about 132.8 mm×375 mm×1.5 mm. It can be seen that the antenna array in the embodiment of the present disclosure has the technical characteristics of wide bandwidth, high gain and miniaturization, and the antenna array in the embodiment of the present disclosure is applied to 5G mobile communication of n77 (3.3 GHz to 4.2 GHz) and n78 (3.3 GHz to 3.8 GHz) frequency bands.

In some examples, there is a certain distance between orthographic projections of the centers of the radiation element 31 and the first slot 21 on the dielectric layer 1. For example, where the radiation element 31 is circular, there is a certain distance between an orthographic projection of a center of the circle of the radiation element 31 on the dielectric layer 1 and an orthographic projection of a center of the circle of the first slot 21 on the dielectric layer 1; where the radiation element 31 is rectangular or square, there is a certain distance between an orthographic projection of an intersection point of diagonal lines of the radiation element 31 on the dielectric layer 1 and the orthographic projection of the center of the circle of the first slot 21 on the dielectric layer 1. In this way, optimal impedance matching can be achieved.

In some examples, the antenna includes not only the above-described structure, but also a second slot 22 provided between two adjacent first slots 21 on a same side edge of the ground electrode layer 2. The second slot 22 includes, but is not limited to, a rectangular slot.

In some examples, a cover plate 4 is further provided on an upper side of the first microstrip line 32 and the radiation element 31 of the antenna structure away from the second surface of the dielectric layer 1, so as to protect the elements in the antenna structure. The cover plate 4 may be made of glass. It should be noted that the cover plate 4 is fixed to the layer, where the radiation element 31 and the first microstrip line 32 are located, through optically clear adhesive.

Figure 4A:
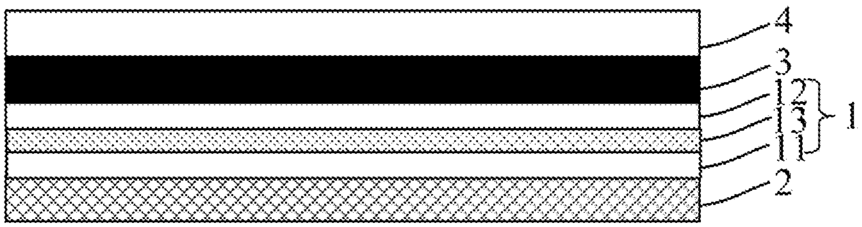

FIG. 4*a* is a cross-sectional view of another antenna in an embodiment of the present disclosure. In some examples, as shown in FIG. 4*a*, the dielectric layer 1 in the embodiment of the present disclosure includes a first dielectric sub-layer 11 and a second dielectric sub-layer 12 which are stacked together, wherein a surface of the first dielectric sub-layer 11 away from the second dielectric sub-layer 12 serves as the first surface of the dielectric layer 1, a surface of the second dielectric sub-layer 12 away from the first dielectric sub-layer 11 serves as the second surface of the dielectric layer 1. That is, the ground electrode layer 2 is disposed on a side of the first dielectric sub-layer 11 away from the second dielectric sub-layer 12, and the radiation element and the first microstrip line are disposed on a side of the second dielectric sub-layer 12 away from the first dielectric sub-layer 11. In addition, the first dielectric sub-layer 11 and the second dielectric sub-layer 12 are bonded together through an adhesive layer 13. In some examples, the first dielectric sub-layer 11 and the second dielectric sub-layer 12 may each be made of glass, so that the antenna is at least partially transparent, and the antenna is light and thin. In some examples, a material of the adhesive layer 13 includes, but is not limited to, optically clear adhesive.

Figure 4B:
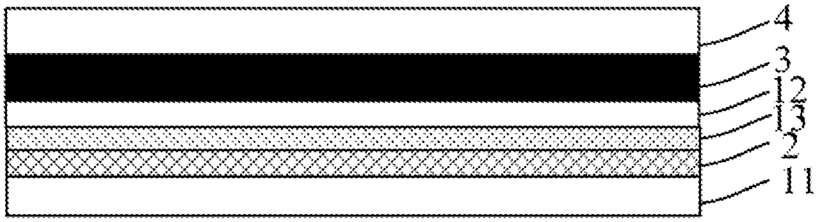

FIG. 4*b* is a cross-sectional view of another antenna in an embodiment of the present disclosure. In some examples, as shown in FIG. 4*b*, the antenna structure is substantially the same as that shown in FIG. 4*a*, except that the ground electrode layer 2 is disposed on a side of the first dielectric sub-layer 11 close to the second dielectric sub-layer 12, so that the ground electrode layer 2 may be protected by the first dielectric sub-layer 11.

In some examples, the antenna includes not only the above-mentioned structure, but also a feeding structure 5 on the second surface of the dielectric layer 1. The feeding structure 5 is connected to the first microstrip lines 32 and configured to feed the first microstrip lines 32. The feeding structure 5 may adopt a structure of a converter 52 connected to the microstrip lines. For example, the feeding structure 5 includes at least one feeding unit 51 and the converter 52, wherein each feeding unit 51 adopts a power division network formed by connecting a plurality of second microstrip lines 511 together. If only one side edge of the ground electrode layer 2 of the antenna is provided with the first slots 21, and at a position of each first slot 21 is correspondingly provided with one radiation element 31, the at least one feeding unit 51 may include only one feeding unit 51 in this case. The number of radiation elements 31 in this case is $2^n$, n>2, and n is an integer; the number of the first microstrip lines 32 is also 2', and the first microstrip lines 32 are connected to the radiation elements 31 in a one-to-one correspondence. The corresponding feeding unit 51 includes n stages of second microstrip lines 511, one second microstrip line 511 at a $1^{st}$ stage is connected to two adjacent first transmission lines, and the first transmission lines connected to different second microstrip lines 511 at the $1^{st}$ stage are different; one second microstrip line 511 at an $m^{th}$ stage is connected to two adjacent second microstrip lines 511 at an $(m-1)^{th}$ stage, and the second microstrip lines 511 at the $(m-1)^{th}$ stage connected to different second feeding lines 511 at the $m^{th}$ stage are different; wherein m is greater than or equal to 2 and less than or equal to n, and m is an integer. In this case, the number of the second microstrip line 511 at the $n^{th}$ stage is one, the second microstrip line 511 at the $n^{th}$ stage is connected to the converter 52, and the converter 52 is used for feeding a microwave signal. If two opposite side edges of the ground electrode layer 2 are each provided with the first slots 21, and at the position of each first slot 21 is provided with one radiation element 31. In this case, the feeding structure 5 may include two feeding units 51, and each feeding unit 51 may also adopt the above structure, except that the converter 52 in the feeding structure 5 may adopt a three-port converter 52, in which case, the second microstrip lines 511 at the $n^{th}$ stage of the two feeding units 51 are connected to two different ports of the converter structure, respectively. In order to clarify the antenna structure in the embodiments of the present disclosure, the antenna structure in the embodiments of the present disclosure is specifically described below with n being 3.

FIG. 5 is a top view of another antenna structure in an embodiment of the present disclosure. In one example, as shown in FIG. 5, taking the 2×8 array antenna as an example, in the antenna, two side edges of the ground electrode layer 2 along a length direction of the ground electrode layer 2 are a first side edge and a second side edge, respectively, and 8 numbers of first slots 21 are disposed on each of the first side edge and the second side edge. Meanwhile, at a position corresponding to any one of the first slots 21 is provided with one radiation element 31, that is, on each side edge is provided with 8 numbers of radiation elements 31. Each radiation element 31 is connected to one first microstrip line 32. The feeding structure 5 on the second surface of the dielectric layer 1 of the antenna includes two feeding units 51 and a converter 52. The converter 52 may be a T-type converter 52, a Y-type converter 52, or the like. That is, the converter 52 includes a first feeding port, a second feeding port and a third feeding port. Each feeding unit 51 includes three stages of second microstrip lines 511, one second microstrip line 511 at a $1^{st}$ stage is connected to two adjacent first transmission lines, and the first transmission lines connected to different second microstrip lines 511 at the $1^{st}$ stage are different. For example, from top to bottom, the $1^{st}$ second microstrip line 511 at the $1^{st}$ stage is connected to the first transmission lines connected to the $1^{st}$ and $2^{nd}$ radiation units, and the $2^{nd}$ second microstrip line 511 at the $1^{st}$ stage is connected to the first transmission lines connected to the $3^{rd}$ and $4^{th}$ radiation units. One second microstrip line 511 at a $2^{nd}$ stage is connected to two adjacent second microstrip lines 511 at the $1^{st}$ stage, and the second microstrip lines 511 at the $1^{st}$ stage connected to different second feeding lines 511 at the $2^{nd}$ stage are different. For example, from top to bottom, the $1^{st}$ second microstrip line 511 at the $2^{nd}$ stage is connected to the $1^{st}$ and $2^{nd}$ second microstrip lines 511 at the $1^{st}$ stage; the $2^{nd}$ second microstrip line 511 at the $2^{nd}$ stage is connected to the $3^{rd}$ and $4^{th}$ second microstrip lines 511 at the $1^{st}$ stage; the second microstrip line 511 at the $3^{rd}$ stage is connected to the two second microstrip lines 511 at the $2^{nd}$ stage. With continued reference to FIG. 4, the second feeding port and the third feeding port of the T-shaped converter 52 are connected to the second microstrip lines 511 at the $3^{rd}$ stage of the two feeding units 51, respectively. It can be seen that only a microwave signal fed by the first feeding unit 51 of the T-shaped converter 52 is equally split by three stages of power division, namely, sequentially split by one-to-two, one-to-two and one-to-four through the left and right two feeding units 51 including three stages of second microstrip lines 511, so that a 2×8 antenna array design of one-to-sixteen division is implemented.

With continued reference to FIG. 5, the feeding structure 5 in the antenna is directly electrically connected to the first microstrip lines 32, that is, the second microstrip line 511 at the $1^{st}$ stage is directly connected to the first microstrip line. In this case, the first microstrip line 32 and the second microstrip line 511 may be disposed in a same layer, and be made of a same material. That is, a pattern including the first microstrip line 32 and the second microstrip line 511 is formed in a same patterning process. FIG. 6 is a cross-sectional view of another antenna in an embodiment of the present disclosure. As shown in FIG. 6, the feeding structure 5 and the first microstrip line 32 are disposed on two opposite surfaces of the second dielectric sub-layer 12, respectively. In this case, an orthographic projection of the second microstrip line 511 in the feeding structure 5 on the first dielectric sub-layer 11 at least partially overlaps the orthographic projection of the first microstrip line 32 on the first dielectric sub-layer 11, so that a microwave signal may be fed into the first microstrip line 32 in a couple feeding manner, and is radiated by the radiation element 31.

With continued reference to FIG. 5, the first slots 21 on the first side edge of the ground electrode layer 2 are uniformly arranged, the first slots 21 on the second side edge may also be uniformly arranged. Correspondingly, the radiation elements 31 disposed in one-to-one correspondence with the first slots 21 on the first side edge are uniformly arranged, the radiation elements 31 disposed in one-to-one correspondence with the first slots 21 on the second side edge are uniformly arranged, and an arrangement manner of the radiation elements 31 is the same as that of the first microstrip lines 32 connected to the radiation elements 31, respectively. In this case, the first slots 21 are arranged in mirror symmetry with respect to an extending direction of a perpendicular bisector of a width of the ground electrode layer 2, the radiation elements 31 and the first microstrip lines 32 are also arranged in mirror symmetry with respect to the extending direction of the perpendicular bisector of the width of the ground electrode layer 2. The corresponding feeding structure 5 adopts a structure of three stages of power equal-division, and the feeding structure 5 is also arranged in mirror symmetry with respect to a central axis in the length direction of the ground electrode layer 2.

FIG. 7 is a graph of $S_{11}$ parameter for ports of the 2×8 antenna array shown in FIG. 5. As shown in FIG. 7, an impedance bandwidth of the antenna array is 1.34 GHz (3.16 GHz to 4.5 GHz, $S_{11}$<−10 dB)/1.5 GHz (3 to 4.5 GHz, $S_{11}$<−6 dB). FIG. 8 is a plan view of the 2×8 antenna array shown in FIG. 5 at a frequency f=3.75 GHz; FIG. 9 is a polar representation of the plane pattern of the 2×8 antenna array shown in FIG. 5 at a frequency f=3.75 GHz. A gain of the antenna array is 10.59 dBi and a half power beam-width is 10°/23° at the frequency of 3.75 GHz as shown in FIGS. 8 and 9.

FIG. 10 is a top view of another antenna in an embodiment of the present disclosure. In another example, as shown in FIG. 5, it is substantially the same as the above example, except that ground electrode layer 2 includes a first ground electrode sub-layer 201 and a second ground electrode sub-layer 202 which are arranged side by side. A side edge of the first ground electrode sub-layer 201 opposite to the second ground electrode sub-layer 202 serves as the first side edge of the ground electrode layer 2, that is, the first slot 21 and the second slot 22 are disposed on this side edge; and a side edge of the second ground electrode sub-layer 202 opposite to the first ground electrode sub-layer 201 serves as the first side edge of the ground electrode layer 2, that is, the first slot 21 and the second slot 22 are disposed on this side edge. In addition, the first ground electrode sub-layer 201 and the second ground electrode sub-layer 202 are electrically connected together, for example, have a one-piece structure. The feeding structure in this antenna is substantially the same as that in the antenna shown in FIG. 5, and therefore will not be described in detail here. FIG. 11 is a top view of another antenna structure in an embodiment of the present disclosure. In another example, as shown in FIG. 5, it is substantially the same as the above example, except that one of the first side edge and the second side edge of the ground electrode layer 2 is provided with the first slots 21. In FIG. 8, the first slot 21 is disposed only on the first side edge as an example, in this case, the feeding structure 5 includes only one feeding unit 51, and the structure of the feeding unit 51 is the same as the above structure, so the description is not repeated here. In addition, in the feeding structure 5, the converter 52 may adopt a two-port feeding structure 5, for example, including a first feeding port and a second feeding port, the second feeding port is connected to the second microstrip line 511 at the 3$^{rd}$ stage, and the first feeding port is used for feeding the microwave signal. Regardless of any of the above antenna structures, in some examples, there is a certain distance between the orthographic projections of the centers of the first slot 21 and the radiation element 31 on the dielectric layer 1, that is, an offset is formed between the centers of the first slot 21 and the radiation element 31, which are correspondingly arranged to each other. Such an arrangement is convenient for achieving optimal impedance matching.

In some examples, the first microstrip line 32 may adopt an L-shaped structure, which includes a first portion and a second portion electrically connected together. The first portion is connected to the radiation element 31, the second portion is connected to the feeding structure 5 (for example, connected to the second microstrip line 511 at the 1$^{st}$ stage), and an extending direction of the first portion is perpendicular to an extending direction of the second portion. A corner connecting the first portion and the second portion may be a rounded chamfer or a flat chamfer. The corner connecting the first portion and the second portion preferably have a non-right angle, so that the microwave signal is prevented from being reflected at this position, and the transmission loss of the microwave signal is prevented from being increased.

In some examples, the first microstrip line 32 is a microstrip line of 50Ω, that is, an impedance of the first microstrip line 32 is about 50Ω. Alternatively, a microstrip line with a corresponding impedance may be selected as the first microstrip line 32, according to the parameter requirements on the gain of the antenna structure.

In some examples, an arc of the first slot 21 is about 200° to 300°, for example, may be 250°. The first slot 21 has a chord length of about 20 mm to 25 mm, for example, may be 22.7 mm. In the embodiments of the present disclosure, an extending direction of the chord of the first slot 21 is parallel to the length direction of the ground electrode layer 2. In some examples, a distance between two adjacent first slots 21 on the same side edge of the ground electrode layer 2 is about 40 mm to 60 mm, for example, may be 50 mm. In this case, if the second slot 22 is provided between two adjacent first slots 21, a depth and a width of the second slot 22 are both about 20 mm to 30 mm, for example, the depth and the width of the second slot 22 are both 25 mm.

In some examples, the radiation element 31 has a size of about 2 mm to 3 mm, and may be, for example, 2.4 mm.

In some examples, a material of the ground electrode layer 2, the first microstrip line 32, the second microstrip line 511 and the radiation element 31 include, but is not limited to, aluminum or copper.

In some examples, the dielectric layer 1, the first dielectric sub-layer 11, and the second dielectric sub-layer 12 may each be made of glass, in which case, the antenna structure made of glass may be partially transparent, and is light and thin. In some examples, the dielectric layer 1 may be made of glass having a dielectric constant of 5.2, which glass has the characteristics of high efficiency, light weight, low cost, easy mass production, good light transmittance, and the like. In some examples, the dielectric layer 1 has a thickness of about 0.5 mm to 2 mm, for example, 1 mm. It should be noted that, in the embodiments of the present disclosure, the dielectric layer 1, the first dielectric sub-layer 11, and the second dielectric sub-layer 12 each include but are not limited to glass, and the material of these layers may be selected from flexible materials, such as polyimide or optically clear adhesive.

To sum up, the antenna provided by the embodiments of the present disclosure may be applied to 5G mobile communication applications of n77 (3.3 GHz to 4.2 GHz) and n78 (3.3 GHz to 3.8 GHz) frequency bands, and adopts a glass material together with the arc-shaped first slot 21 arranged in the ground electrode layer 2, miniaturization and an array with a mirror symmetric structure and power equal-division feeding, so that the technical indexes of wide bandwidth, high gain and miniaturization of the antenna array are realized, and the antenna structure has the characteristics of partial light transmission and being light and thin.

In a second aspect, an embodiment of the present disclosure provides a method for manufacturing an antenna, which may be used to manufacture the antenna described above. The method specifically includes the following steps:

Step S1, providing a dielectric layer 1.

The dielectric layer 1 may be made of glass, and the step S1 may include a step of cleaning the dielectric layer 1.

Step S2, forming a reference electrode layer 2 on a first surface of the dielectric layer 1 through a patterning process. At least one side edge of the reference electrode layer 2 is formed with a first slot 21, and the first slot 21 is an arc-shaped slot.

In some examples, the step S2 may specifically include: depositing a first metal film on the first surface of the dielectric layer 1 through a manner including, but not limited to, magnetron sputtering. Then, the step S2 may include: coating a photoresist, exposing and developing the photoresist, then performing wet etching, and stripping the photoresist after etching, to form a pattern including the reference electrode layer 2. In some examples, the reference electrode layer 2 may further include a second slot 22 disposed between two adjacent first slots 21, and in this case, the first slot 21 and the second slot 22 may be formed in one patterning process.

Step S3, forming a pattern including radiation elements 31 and first microstrip lines 32 on a second surface of the dielectric layer 1 through a patterning process. An orthographic projection of each radiation element 31 on the dielectric layer 1 at least partially overlaps an orthographic projection of one first slot 21 on the dielectric layer 1, and preferably the orthographic projection of the radiation element 31 on the dielectric layer 1 is within the orthographic projection of the first slot 21 on the dielectric layer 1. Alternatively, in some examples, the radiation element 31 and the first microstrip line 32 may be formed in two patterning processes, respectively.

In some examples, the step S3 may specifically include: depositing a second metal film on the first surface of the dielectric layer 1 through a manner including, but not limited to, magnetron sputtering. Then, the step S3 may include: coating a photoresist, exposing and developing the photoresist, then performing wet etching, and stripping the photoresist after etching, to form a pattern including the radiation element 31 and the first microstrip line 32.

It should be noted that, the performing sequences of the above steps S2 and S3 may be interchanged. That is, the radiation element 31 and the first microstrip line 32 may be formed on the second surface of the dielectric layer 1, and then the reference electrode layer 2 is formed on the first surface of the dielectric layer 1, all of which are within the protection scope of the embodiment of the present disclosure.

In some examples, the dielectric layer 1 in the embodiment of the present disclosure includes a first dielectric sub-layer 11 and a second dielectric sub-layer 12 which are stacked together. A surface of the first dielectric sub-layer 11 away from the second dielectric sub-layer 12 serves as the first surface of the dielectric layer 1, and a surface of the second dielectric sub-layer 12 away from the first dielectric sub-layer 11 serves as the second surface of the dielectric layer 1. That is, the ground electrode layer 2 is disposed on a side of the first dielectric sub-layer 11 away from the second dielectric sub-layer 12, and the radiation element 31 and the first microstrip line 32 are disposed on a side of the second dielectric sub-layer 12 away from the first dielectric sub-layer 11. In addition, the first dielectric sub-layer 11 and the second dielectric sub-layer 12 are bonded together through an adhesive layer 13. The manufacturing method in the embodiment of the present disclosure may alternatively be implemented by the following steps.

Step S11, providing a first dielectric sub-layer 11.

The first dielectric sub-layer 11 may be made of glass, and the step S11 may include a step of cleaning the first dielectric sub-layer 11.

Step S12, forming a reference electrode layer on the first dielectric sub-layer 11 through a patterning process. At least one side edge of the reference electrode layer is provided with a first slot 21, and the first slot 21 is an arc-shaped slot.

The step of forming the reference electrode layer 2 is the same as step S2, and therefore, the description thereof is not repeated here.

Step S13, providing a second dielectric sub-layer 12.

The second dielectric sub-layer 12 may be made of glass, and the step S13 may include a step of cleaning the second dielectric sub-layer 12.

S14, forming a pattern including radiation elements 31 and first microstrip lines 32 on a second dielectric sub-layer 12 through a patterning process. An orthographic projection of each radiation element 31 on the second dielectric sub-layer 12 is within the orthographic projection of one first slot 21 on the dielectric layer 1. Alternatively, in some examples, the radiation element 31 and the first microstrip line 32 may be formed in two patterning processes, respectively.

The step of forming the radiation elements 31 and the first microstrip lines 32 are the same as that of step S3, and therefore, the description thereof is not repeated here.

S15, bonding together the first dielectric sub-layer 11 formed with the reference electrode layer 2 and the second dielectric sub-layer 12 formed with the radiation elements 31 and the first microstrip lines 32, through an adhesive layer 13.

It should be noted that in the above description, the steps S11 and S12 precede the steps S13 and S14 as an example, and in a practical process, the steps S13 and S14 may be performed first, and then the steps S11 and S12 may be performed.

In addition, in the embodiments of the present disclosure, the antenna structure does not includes only the dielectric layer 1, the reference electrode layer 2, the radiation element 31, and the first microstrip line 32 formed as described above. The antenna structure may further include a feeding structure 5 formed on the second surface of the dielectric layer 1 and electrically connected to the first microstrip line 32. If the feeding structure 5 adopts the feeding network formed by the second microstrip line 511, the feeding structure 5 consisting of the second microstrip line 511 may be simultaneously formed while forming the first microstrip line 32 and the radiation element 31.

In the embodiments of the present disclosure, each element of the antenna structure may be formed on the first dielectric sub-layer 11 and the second dielectric sub-layer 12 made of glass through a patterning process, so that the formed antenna structure may be miniaturized and be light and thin.

It will be understood that the above embodiments are merely exemplary embodiments adopted to illustrate the principles of the present disclosure, and the present disclosure is not limited thereto. It will be apparent to one of ordinary skill in the art that various modifications and improvements can be made without departing from the spirit and scope of the present disclosure, and such modifications and improvements are also considered to be within the scope of the present disclosure.

What is claimed is:

1. An antenna, comprising:

a dielectric layer having a first surface and a second surface opposite to each other in a thickness direction of the dielectric layer;

a reference electrode layer on the first surface of the dielectric layer, wherein at least one side edge of the reference electrode layer each is provided with at least one first slot, and the at least one first slot each is an arc-shaped slot;

at least one radiation element on the second surface of the dielectric layer, wherein an orthographic projection of each of the at least one radiation element on the dielectric layer is within an orthographic projection of one of the at least one first slot on the dielectric layer; and at least one first microstrip line on the second surface of the dielectric layer, wherein each of the at least one first microstrip line is electrically connected to one of the at least one radiation element, and an orthographic projection of the first microstrip line on the dielectric layer at least partially overlaps an orthographic projection of the reference electrode layer on the dielectric layer, wherein the at least one radiation element is in a one-to-one correspondence with the at least one first slot, and a certain distance exists between orthographic projections of centers of the radiation element and the first slot, which are correspondingly arranged to each other, on the dielectric layer, and the orthographic projection of the center of the radiation element on the dielectric layer, is not on an orthographic projection of a symmetry axis of the first slot in correspondence with the radiation element on the dielectric layer, wherein the symmetry axis is perpendicular to a side edge, on which the first slot is located, of the reference electrode layer.

2. The antenna according to claim 1, further comprising a feeding structure, wherein the feeding structure is on the second surface of the dielectric layer, and orthographic projections of the feeding structure and the first microstrip line on the dielectric layer at least partially overlap each other.

3. The antenna according to claim 2, wherein the feeding structure is electrically connected to the at least one first microstrip line.

4. The antenna according to claim 2, wherein the reference electrode layer has a first side edge and a second side edge in a length direction of the reference electrode layer, and the first side edge and the second side edge are opposite to each other; at least one of the first side edge and the second side edge is provided with the at least one first slot; the feeding structure comprises at least one feeding unit, and each of the at least one feeding unit is electrically connected to the first microstrip lines connected to the radiation elements on a same side as the feeding unit.

5. The antenna according to claim 4, wherein both the first side edge and the second side edge of the reference electrode layer are provided with the at least one first slot, the at least one first slot on each of the first side edge and the second side edge comprises $2^n$ number of the first slots, and each of the at least one feeding unit comprises n stages of second microstrip lines;

one second microstrip line at a $1^{st}$ stage is connected to two adjacent first microstrip lines, and the first microstrip lines connected to different second microstrip lines at the $1^{st}$ stage are different; one second microstrip line at an $m^{th}$ stage is connected to two adjacent second microstrip lines at an $(m-1)^{th}$ stage, and the second feeding lines at the $(m-1)^{th}$ stage connected to different second feeding lines at the $m^{th}$ stage are different; wherein n is greater than or equal to 2, m is greater than or equal to 2 and less than or equal to n, and both m and n are integers.

6. The antenna according to claim 5, wherein the reference electrode layer comprises a first reference electrode sub-layer and a second reference electrode sub-layer which are arranged side by side, a side edge of the first reference electrode sub-layer opposite to the second reference electrode sub-layer is the first side edge, and a side edge of the second reference electrode sub-layer opposite to the first reference electrode sub-layer is the second side edge.

7. The antenna according to claim 5, wherein the feeding structure further comprises a converter; wherein the converter comprises a first feeding port, a second feeding port, and a third feeding port; and the second feeding port and the third feeding port are connected to two second microstrip lines at the nth stage of different feeding units, respectively.

8. The antenna according to claim 4, wherein the antenna is in mirror symmetry with respect to an extending direction of a perpendicular bisector of a width of the reference electrode layer.

9. The antenna according to claim 4, wherein the feeding structure is in mirror symmetry with respect to an extending direction of a perpendicular bisector of a width of the reference electrode layer.

10. The antenna according to claim 4, wherein only one of the first side edge and the second side edge of the reference electrode layer is provided with the at least one first slot, the at least one first slot comprises $2^n$ number of the first slots, and each of the at least one feeding unit comprises n stages of second microstrip lines;

one second microstrip line at a $1^{st}$ stage is connected to two adjacent first transmission lines, and the first transmission lines connected to different second microstrip lines at the $1^{st}$ stage are different; one second microstrip line at an $m^{th}$ stage is connected to two adjacent second microstrip lines at an $(m-1)^{th}$ stage, and the second feeding lines at the $(m-1)^{th}$ stage connected to different second feeding lines at the $m^{th}$ stage are different; wherein n is greater than or equal to 2, m is greater than or equal to 2 and less than or equal to n, and both m and n are integers.

11. The antenna according to claim 10, wherein the feeding structure further comprises a converter; wherein the converter comprises a first feeding port and a second feeding port, and the second feeding port is connected to the second microstrip line at the $n^{th}$ stage of the feeding unit.

12. The antenna according to claim 1, wherein the dielectric layer comprises a first dielectric sub-layer and a second dielectric sub-layer stacked together; the reference electrode layer is on a side of the first dielectric sub-layer away from the second dielectric sub-layer, the at least one radiation element and the at least one first microstrip line are on a side of the second dielectric sub-layer away from the first dielectric sub-layer, and the first dielectric sub-layer is connected to the second dielectric sub-layer through an adhesive layer.

13. The antenna according to claim 1, wherein on a same side edge of the reference electrode layer, a distance between every two adjacent first slots is constant.

14. The antenna according to claim 1, wherein on a same side edge of the reference electrode layer, a second slot is disposed between two adjacent first slots.

15. The antenna according to claim 14, wherein the second slot comprises a rectangular slot.

16. The antenna according to claim 1, wherein an orthographic projection of each of the at least one radiation element on the dielectric layer is within an orthographic projection of the first slot corresponding to the radiation element on the dielectric layer.

17. The antenna according to claim 1, wherein a shape of each of the at least one radiation element comprises a circle.

18. The antenna according to claim 2, wherein each of the at least one first microstrip line comprises a first portion and a second portion electrically connected to each other, the first portion is connected to the corresponding radiation element, the second portion is electrically connected to the feeding structure, and an extending direction of the first portion and an extending direction of the second portion are perpendicular to each other.

19. The antenna according to claim 1, wherein an impedance of each of the at least one first microstrip line is 50Ω.

* * * * *